United States Patent [19]

Gummery

[11] Patent Number: 5,709,131
[45] Date of Patent: Jan. 20, 1998

[54] VEHICLE CONTROL APPARATUS

[76] Inventor: Neil Gummery, Mansion House, St. Helens Road, Ormskirk, Lancashire, L39 4QJ, United Kingdom

[21] Appl. No.: 693,222
[22] PCT Filed: Feb. 21, 1995
[86] PCT No.: PCT/GB95/00355
 § 371 Date: Aug. 21, 1996
 § 102(e) Date: Aug. 21, 1996
[87] PCT Pub. No.: WO95/22469
 PCT Pub. Date: Aug. 24, 1995

[30] Foreign Application Priority Data

Feb. 22, 1994 [GB] United Kingdom ............ 9403309

[51] Int. Cl.[6] ............................................. B60K 26/04
[52] U.S. Cl. .................................. 74/481; 477/209
[58] Field of Search ............................. 477/199, 209, 477/211; 74/481, 482

[56] References Cited

U.S. PATENT DOCUMENTS

| 2,930,250 | 3/1960 | Atran | 74/482 |
| 3,226,997 | 1/1966 | Malloy | 74/482 |
| 3,918,320 | 11/1975 | Glick, Jr. et al. | 74/513 |
| 4,424,723 | 1/1984 | Gockel | 477/209 X |
| 4,436,191 | 3/1984 | Perry | 477/209 |
| 4,998,983 | 3/1991 | Ruprecht et al. | 477/209 |
| 5,025,905 | 6/1991 | Lenz | 477/209 |
| 5,121,651 | 6/1992 | Bristow | 74/481 |
| 5,129,492 | 7/1992 | Lenz et al. | 477/27 |
| 5,421,217 | 6/1995 | Loustaunau | 74/482 |
| 5,542,312 | 8/1996 | Peters | 74/481 |

FOREIGN PATENT DOCUMENTS

| 2407093 | 5/1979 | France . |
| 1480333 | 1/1970 | Germany . |

Primary Examiner—Khoi Q. Ta
Assistant Examiner—Peter T. Kwon
Attorney, Agent, or Firm—Dennison, Meserole, Pollack & Scheiner

[57] ABSTRACT

Apparatus for adapting vehicle accelerator and brake pedals to manual operation, comprising two elongate control members 10,20 each secured to the pedals by a clamp 11,21 comprising a body portion 41 having a first bent over portion 51 positioned around a first edge of a vehicle pedal; a bracket portion 42 having a second bent over portion 52 positioned around a second edge of a vehicle pedal, the bracket portion 42 operatively slidably displaceable with respect to said body portion 41; retainer 44 for retaining the bracket portion 42 at a fixed position in relation to the body portion 41; and locking adjuster 27 including a locking plate 46 urged against a surface of a vehicle pedal.

13 Claims, 3 Drawing Sheets

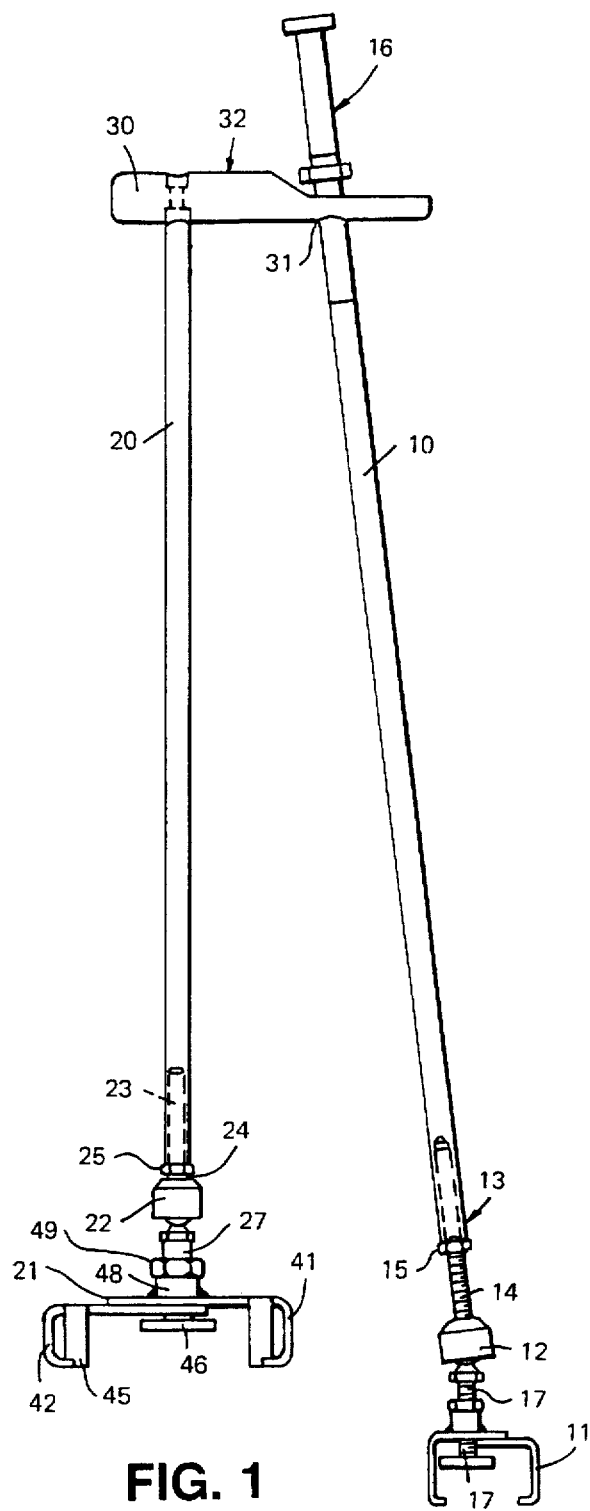
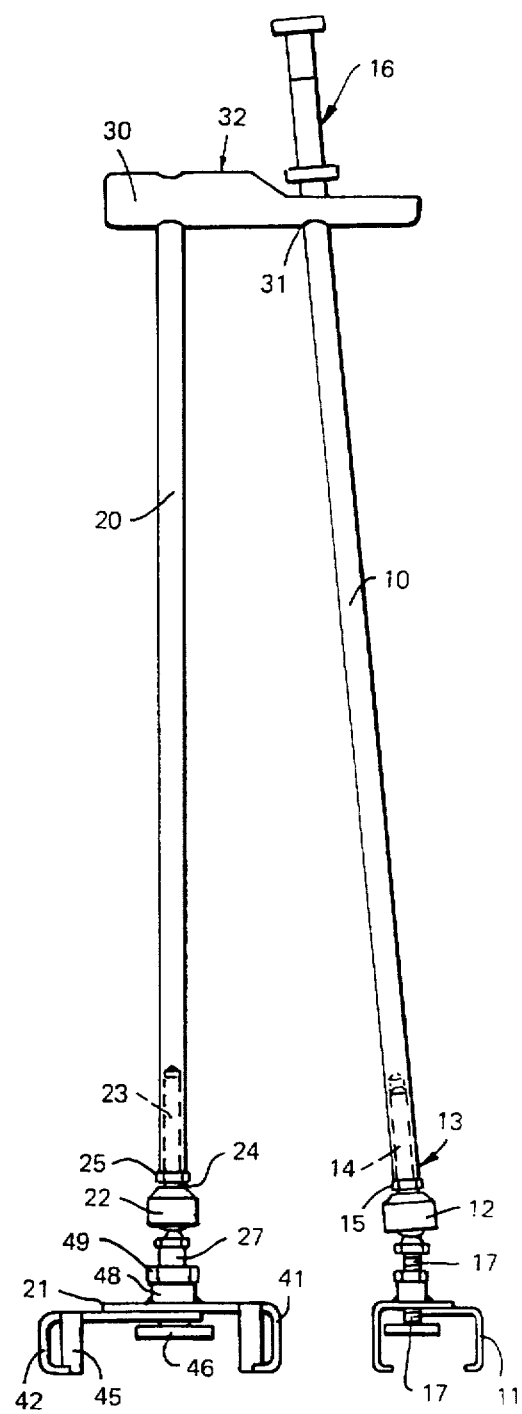
FIG. 1
FIG. 2

VEHICLE CONTROL APPARATUS

The present invention relates to a vehicle control apparatus for adapting foot-operated vehicle control pedals to manual operation.

Adaption of foot operated vehicle controls such as a throttle/accelerator pedal and a brake pedal is commonly desired, e.g. for a driver having impaired movement in the lower limbs.

Generally, the known types of vehicle control apparatus such as described in GB 1,169,568 (Lewthwaite) require a permanent fixing to the steering column or to the dashboard of the vehicle. This permanent fixing necessarily disfigures the appearance of the vehicle and means that the control apparatus is not readily transferred to another vehicle.

Generally, whilst some of these known apparatus do not prevent pedal operation using the feet, greater effort is required than for normal operation, i.e. known apparatus impedes pedal movement.

Known apparatus for adapting a vehicle, for example a car, is usually manufactured specific to a particular model. Apparatus designed for use with one model of car usually does not fit and function correctly if applied to another model.

A portable, adjustable vehicle control apparatus is described in U.S. Pat. No. 4,424,723(Gockel). This known apparatus comprises two control rods each swivelingly connected at one end to a respective pedal clamp. However, the apparatus described in U.S. Pat. No. 4,424,723 suffers a number of disadvantages.

According to the present invention there is provided a vehicle control apparatus for adapting a vehicle accelerator pedal and a vehicle brake pedal to manual operation, comprising:

an elongate accelerator control member having at one end thereof a first securing means for securing the accelerator control member to a vehicle accelerator pedal;

an elongate brake control member having at one end thereof a second securing means for securing the brake control member to a vehicle brake pedal; characterised in that said first and/or said second securing means comprises:

a body portion having a first bent over portion, said first bent-over portion operatively locatable around a first edge of a vehicle pedal;

a bracket portion having a second bent over portion, said second bent-over portion operatively locatable around a second edge of a vehicle pedal, said bracket portion operatively slidably displaceable with respect to said body portion;

retaining means for retaining said bracket portion at a fixed position in relation to said body portion; and locking means operatively passing through an aperture in said body portion, said locking means having a locking plate, said locking means operatively urging said locking plate against a surface of a vehicle pedal.

The bracket portion is operatively slidably displaceable with resect to the body portion to allow the securing means to be adjusted in width to fit any pedal size within a predetermined range. Different bracket portions of different sizes may be used, making the securing means further adjustable to fit a wide range of pedal sizes. In use, the pedal is securely held. In the preferred embodiment, only the bent over portions fit around the pedal so that the range of movement of the pedal is not impeded to any significant extent.

The preferred embodiment of the vehicle control apparatus is particularly designed for adapting brake and accelerator pedals to manual operation and is therefore primarily intended for use on vehicles without a clutch pedal. Particular, non exclusive, examples are a car, van or lorry with an automatic gearbox, or an electrically powered delivery vehicle.

The vehicle control apparatus described need only be secured to the pedals. Attachment to the steering column or dashboard is not necessary, but nevertheless may be effected if desired.

In the preferred embodiment, the body portion fits around a right-hand edge of a rectangular pedal, and the bracket portion fits around a left-hand edge, or vice versa. The bent over portion of each of the bracket portion and the body portion abuts a rear surface of the pedal, whilst the locking plate abuts a front surface of the pedal.

The locking means is suitably a threaded shaft operatively engageable with a correspondingly threaded aperture of the body portion. Rotation of the threaded shaft in one direction urges the locking plate against a surface of the pedal to retain the pedal in the securing means. By rotating the shaft in the opposite direction to release the locking plate, the securing means may be quickly and easily removed from the pedal. The threaded shaft is conveniently connected directly or through a joint to one of the control members used to depress a pedal.

The locking plate may be allowed a degree of freedom to move relative to the threaded shaft, i.e. the locking plate may be allowed to "wobble". This ensures that the locking plate efficiently abuts a pedal having a nonplanar surface. Also, when pressure is applied to the locking plate via the threaded shaft to operate the pedal, the locking plate is urged yet more tightly against the pedal.

The elongate control members may move lengthwise independently, i.e. in the general direction of travel of the pedals, but are restricted in their independent lateral movement since the accelerator control member passes through an aperture in a handle provided on the brake control member, i.e. the control members move laterally together so that one is always within an easy reach from the other.

Both control members may be adjustable in length so that the apparatus can be adjusted to fit a range of vehicles and a range of driver seating positions. Also, when at least one of the control members is independently adjustable in length, the apparatus may be used with a vehicle having brake and accelerator pedals set at differing distances from the driver.

A joint provided at or near one end of each control member allows the control member to bend laterally relative to the pedals. Preferably, the joint is a universal joint, for example a ball joint or universal linkage. The joint allows the end of the control member secured to the pedal to follow a substantially curvilinear path of the pedal whilst the other end of the control member, in the hand of the driver, follows a substantially linear path. The universal joint in each control member also enables the apparatus to be secured to pedals having lateral spacing within a predetermined range.

To operate the brake pedal, the driver applies pressure with, for example, the ball or palm of one hand, to the handle of the brake control member. This pressure is transferred to the brake pedal via the brake control member. When pressure is removed, the brake pedal and brake control member are allowed to return to an inoperative position, for example due to biasing of the brake pedal.

In use, the end of the accelerator control member remote from the first securing means passes through an aperture in the handle of the brake control member. Preferably, the outward end of the accelerator control member protrudes significantly from the handle of the brake member to form an accelerator handle grip end which may be operated by, for example, the fingers. Alternative handle grip ends of differing lengths may be fitted to the accelerator control member, so that the apparatus is further adjustable to fit different pedal configurations and for the comfort of the user.

The accelerator control member is depressed to operate the accelerator pedal. When released, the elongate accelerator control member returns toward an idle position due to biasing of the accelerator control pedal.

By way of example, a preferred embodiment of the present invention will now be described with reference to the accompanying drawings, in which:

FIG. 1 is a plan view of a vehicle control apparatus in a position of maximum adjustment;

FIG. 2 is a plan view of the vehicle control apparatus of FIG. 1 in a position of minimum adjustment;

Figure 3:
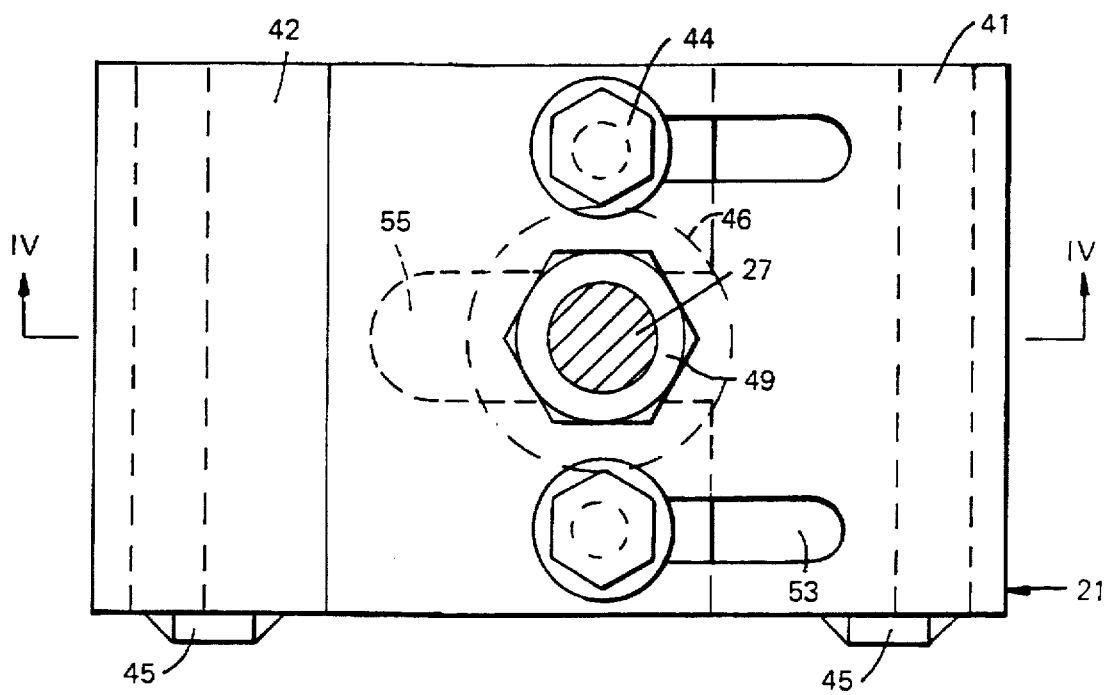
FIG. 3 is a plan view of a clamp for a brake pedal.

Referring to FIGS. 1 and 2, the vehicle control apparatus shown comprises an accelerator control member 10 and a brake control member 20 linked by a handle 30. Throttle control member 10 passes through an aperture 31 in the handle 30. Each control member is provided with an adjustable clamp 11, 21 for securing the control member to a pedal (not shown), a universal joint 12,22 and length adjustment means 13–15, 23–25.

The length adjustment means 13–15 of the accelerator control member 10 comprises a cylindrical shaft 14 having an external screw thread, and an interiorly threaded receiving portion 13. Length adjustment is effected by rotation of threaded shaft 14 relative to receiving portion 13. Lock nut 15 is provided to retain the adjustment means at the desired length. A similar arrangement 23–25 is provided in brake control member 20.

The universal joint 12,22 is shown as a ball joint, although alternatively a mechanical universal linkage or other suitable joint can be used. The joint 12 in the accelerator control member is provided between the threaded shaft 14 and a second threaded shaft 17 which is part of the securing means, i.e. clamp 11. Joint 22 is similarly arranged between shafts 24 and 27.

Handle 30 on the brake control member provides a pressure surface 32 suitable for receiving pressure from a driver's hand. Throttle control member 10 is provided with a handle grip end 16, which screws on to an end of the control member 10. Alternative grip ends of larger or shorter dimensions may be fitted as required.

FIG. 1 shows the apparatus in a maximum adjustment condition for use when the brake and accelerator pedals (not shown) are set at different differences from the driver and are widely laterally spaced. FIG. 2 shows a minimum adjustment condition for use when the pedals are narrowly spaced on a level plane.

Figure 4:
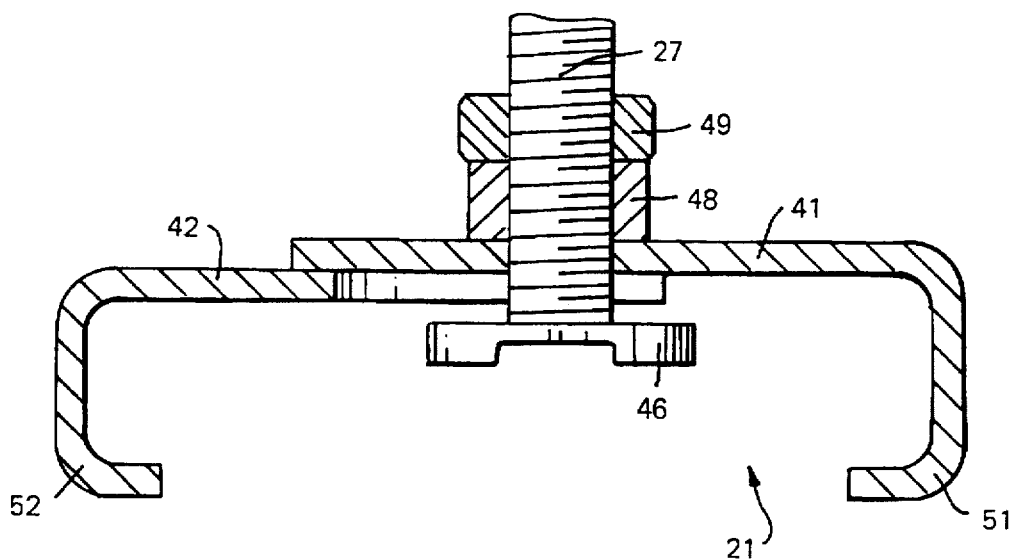
FIG. 4 is a side elevational view of the clamp of FIG. 3.

The adjustable clamp 21 of the brake control member 20 is shown in more detail in FIGS. 3 and 4. As shown in FIG. 4, the clamp comprises a body portion 41 and a bracket portion 42 or 43. Two alternative bracket portions 42 and 43 are shown though only one may be used at a time. The bracket 42 or 43 slides with respect to body portion 41 and the clamp is thus adjustable in width to fit any pedal within a predetermined range. For wider pedals, long bracket 43 is used.

To fit the clamp 21 around the pedal, bracket 42 is moved to its maximum extension and then slid back to the desired width to grip the side edges of the pedal. A bent over portion 51 of the body portion 41 is locatable around a left hand edge of the pedal with an end of the bent over portion 51 abutting a rear surface of the pedal. Similarly, a bent over portion 52 of the bracket portion 42 is locatable around a right hand edge of the pedal with an end of the bent over portion 52 abutting a rear surface of the pedal. One advantage of this arrangement is that the clamp does not impede the range of travel of the pedal.

As shown in FIG. 3, bracket 42 is retained at the desired extension with respect to body portion 41 by retaining means such as bolts 44 which pass through slots 53 in body portion 41 and engage with threaded receiving apertures in bracket 42. When the bolts 44 are only loosely tightened, the bracket portion 42 may slide with respect to body portion 41, guided by bolts 44. Bracket portion 42 is provided with a slot 55 to allow passage of threaded shaft 27.

To secure the clamp to the pedal, threaded shaft 27 is rotated within internally threaded boss 48 provided on body portion 41, thereby forcing locking plate 46 against a front surface of the pedal. The locking plate is allowed a degree of freedom, i.e. to "wobble", to take up any misalignment as for example on a curved pedal. The locking plate 46 also is allowed to rotate freely with respect to threaded shaft 27. Lock nut 49 ensures that locking plate 46 is retained in the desired position.

Bars 45 are provided across between the bent over portion 51 and the remainder of the body portion 41 and/or across between the bent over portion 52 and a remainder of bracket portion 42 or 43. The bars 45 inhibit the clamp from slipping off the pedal in use, even if the locking plate 46 is not securely tightened against the front surface of the pedal due to, for example, the apparatus being poorly installed.

Figure 5:
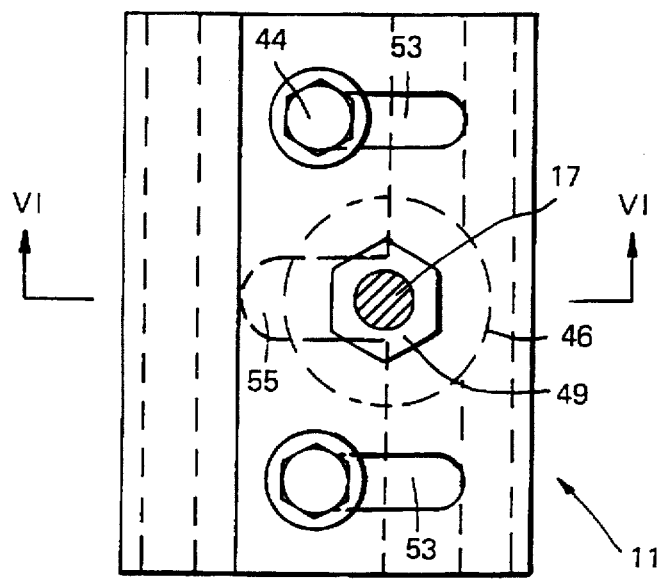
FIG. 5 is a plan view of a clamp for an accelerator pedal.
Figure 6:
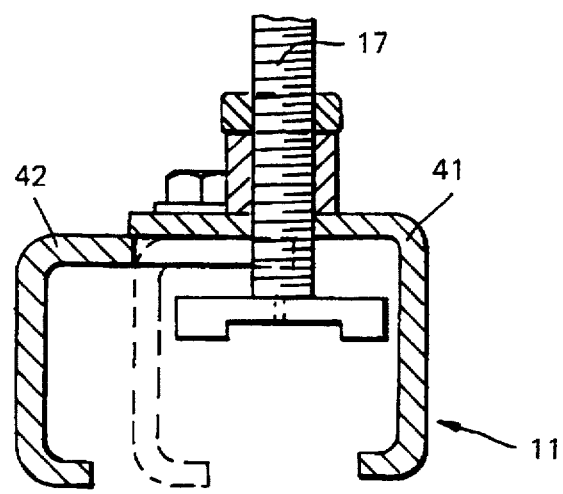
FIG. 6 is a side elevational view of the clamp of FIG. 5.

The adjustable clamp 11 provided on the accelerator control member 10 of FIG. 1 is shown in FIGS. 5 and 6. Clamp 11 is in most respects identical to the clamp 21 shown in FIGS. 3 and 4, with dimensions appropriately reduced to fit an accelerator pedal.

I claim:

1. A vehicle control apparatus for adapting a vehicle accelerator pedal and a vehicle brake pedal to manual operation, comprising:

an elongate accelerator control member (10) having at one end thereof a first securing means (11) for securing the accelerator control member (10) to a vehicle accelerator pedal;

an elongate brake control member (20) having at one end thereof a second securing means (21) for securing the brake control member (20) to a vehicle brake pedal;

characterised in that at least one of said first (11) and said second (21) securing means comprises:

a body portion (41) having a first bent over portion (51), said first bent-over portion (51) operatively locatable around a first edge of a vehicle pedal;

a bracket portion (42) having a second bent over portion (52), said second bent-over portion (52) operatively locatable around a second edge of a vehicle pedal, said bracket portion (42) operatively slidably displaceable with respect to said body portion (41);

retaining means (44) for retaining said bracket portion (42) at a fixed position in relation to said body portion (41); and locking means (27) operatively passing through an aperture in said body portion (41), said locking means (27) having a locking plate (46), said locking means (27) operatively urging said locking plate (46) against a surface of a vehicle pedal.

2. A vehicle control apparatus as claimed in claim 1, wherein one of said first or said second securing means has a retaining bar (45) located thereacross between said first bent over portion (51) and a remainder of said body portion (41) to operatively inhibit said one of said securing means from slipping off a vehicle pedal.

3. A vehicle control apparatus as claimed in claim 1, wherein one of said first or said second securing means comprises a retaining bar (45) located thereacross between said second bent over portion (52) and a remainder of said bracket portion (42) to operatively inhibit said one of said securing means from slipping off a vehicle pedal.

4. A vehicle control apparatus as claimed in claim 1, wherein said locking means shaft (17,27) threaded shaft (17,27) operatively rotatable within a correspondingly internally threaded aperture (48) of said body portion (41).

5. A vehicle control apparatus as claimed in claim 4, wherein said threaded shaft (17) of said first securing means (11) is directly or through a joint (12) connected to said accelerator control member (10).

6. A vehicle control apparatus as claimed in claim 4, wherein said threaded shaft (27) of said second securing means (21) is directly or through a joint (22) connected to said brake control member (20).

7. A vehicle control apparatus as claimed in claim 4, wherein said locking plate (46) is mounted to said threaded shaft (17, 27) for a limited degree of movement relative to said threaded shaft (17, 27).

8. A vehicle control apparatus as claimed in claim 1, wherein said retaining means comprises a bolt (44), said bolt operatively passing through a slot (53) in said bracket portion (41) and engaging with a correspondingly threaded aperture of said bracket portion (42).

9. A vehicle control apparatus as claimed in claim 1, wherein one of said bent over portions is operatively locatable around a right-hand edge of a rectangular pedal, and the other of said bent over portions is operatively locatable around a left-hand edge of the pedal; and said locking plate (46) operatively abuts a front surface of the pedal.

10. A vehicle control apparatus as claimed in claim 1, further comprising a handle (30) on said brake control member (20), said handle having an aperture (31), said accelerator control member (10) operatively passing through said aperture (31) such that said accelerator and brake control members (10,20) can move lengthwise independently but are restricted in their relative lateral movement.

11. A vehicle control apparatus as claimed in claim 1, wherein at least one of the accelerator control member (10) and brake control member (20) further comprises means (13–15, 23–25) for adjusting the length of the member.

12. A vehicle control apparatus as claimed in claim 5, wherein each said joint (12,22) is a mechanical universal linkage.

13. A vehicle control apparatus as claimed in claim 1, wherein said accelerator control member (10) further comprises a removable handle grip end (16).

* * * * *